(12) United States Patent
Burns (10) Patent No.: US 7,788,341 B1
(45) Date of Patent: Aug. 31, 2010

(54) DISPLAYING RESULTS OF SERVER-SIDE FORM VALIDATIONS WITHOUT PAGE REFRESH

(75) Inventor: Edward J. Burns, Altamonte Springs, FL (US)

(73) Assignee: Oracle America, Inc., Redwood City, CA (US)

( * ) Notice: Subject to any disclaimer, the term of this patent is extended or adjusted under 35 U.S.C. 154(b) by 698 days.

(21) Appl. No.: 11/293,338

(22) Filed: Dec. 1, 2005

(51) Int. Cl.
*G06F 15/16* (2006.01)

(52) U.S. Cl. ...................................... 709/219
(58) Field of Classification Search .................. 709/219
See application file for complete search history.

(56) References Cited

U.S. PATENT DOCUMENTS

| | | | |
|---|---|---|---|
| 7,162,687 B2 * | 1/2007 | Pelegri-Llopart et al. ... | 715/234 |
| 2007/0100844 A1 * | 5/2007 | Buttner et al. .............. | 707/100 |

OTHER PUBLICATIONS

Exchanging information with a server without reloading your HTML page, Jan. 2002, [online], [retrieved on Sep. 12, 2008]. Retrieved from the Internet <URL:http://flashmove.com/forum/archive/index.php/t-15583.html> pp. 1-5.*
Fscommand, Sep. 2, 2004 , [online], [retrieved on Sep. 12, 2008]. Retrieved from the Internet <URL: http://web.archive.org/web/20020206225445/http://www-106.ibm.com/developerworks/web/library/wa-exrel/index.html> pp. 1-4.*
Developing Web Applications with JavaServer Faces, Qusay H. Mahmoud, Aug. 2004 , [online], [retrieved on Dec. 4, 2008]. Retrieved from the Internet <URL: http://java.sun.com/developer/technicalArticles/GUI/JavaServerFaces/>.*
Adam, How to use multiple window.onload events with external scripts, Sep. 20, 2005, [online], [retrieved on Apr. 8, 2009]. Retrieved from the Internet <URL: http://www.tek-tips.com/faqs.cfm?fid=4862>.*
Wolski, Java Server Faces—Validation & Error Handling, Oct. 3, 2005, [online], [retrieved on Apr. 8, 2009]. Retrieved from the Internet <URL: http://www.laliluna.de/download/jsf-validation-error-handling-en.pdf>.*

(Continued)

*Primary Examiner*—Philip C Lee
*Assistant Examiner*—Michael Chao
(74) *Attorney, Agent, or Firm*—Osha • Liang LLP (57) ABSTRACT

According to one embodiment of the invention, a technique is provided for validating user-entered data at a server without requiring a page refresh at a client. A server sends, toward a client, a page that comprises a form through which the client's user can input data. The page comprises instructions that cause the client to send, toward the server, data that the user inputted into the form. If the server determines that the data do not satisfy the specified criteria, the server sends an invalidity signal toward the client. The page also comprises instructions that cause the client to display a message in response to receiving the signal. In response to the signal, the client modifies the display of the page to include the message. All of the above is accomplished without the client requesting additional pages from the server, and without the server sending additional pages toward the client.

10 Claims, 2 Drawing Sheets

OTHER PUBLICATIONS

Ball, Jennifer et al., "The Java™ EE 5 Tutorial, For Sun System Application Server Platform Edition 9," Sun Microsystems, Feb. 18, 2006, 1194 pgs.

Campbell, Chris, "Degradable AJAX Form Validation", Particletree. com, retrieved from website: http://particletree.com/features/degradable-ajax-form-validation/, Jun. 6, 2005, 11 pages.

Packt Publishing Ltd., "AJAX and PHP: Building Responsive Web Applications—Chapter 4: AJAX Form Validation", www.packtpub.com, retrieved from internet: http://ajaxphp.packtpub.com/chapter4.htm, Released Feb. 2005, 1 page.

* cited by examiner

DISPLAYING RESULTS OF SERVER-SIDE FORM VALIDATIONS WITHOUT PAGE REFRESH

BACKGROUND

Web browser programs, such as Mozilla Firefox, are commonly used to request web pages and/or other resources from remote web servers. As used herein, a "web page" is a file or document that is processed by a web browser. Typically, a web browser makes such a request by sending a Hypertext Transfer Protocol (HTTP) request toward a remote web server. The HTTP request may be transmitted across several networks, including the Internet, before the request reaches the intended web server.

Upon receiving an HTTP request, a web server typically locates a web page that is identified by a Uniform Resource Locator (URL) specified in the HTTP request. The web server generates an HTTP response that comprises the identified web page, and then sends the HTTP response toward the web browser program. Like the HTTP request, the HTTP response may travel over several networks before reaching its destination.

Typically, when the web browser receives the HTTP response, the web browser interprets the web page that is contained therein and displays, to the web browser's user, content that the web page represents. Such content may include text and images, for example.

Sometimes, the web page comprises a form. A form typically comprises one or more user interface elements through which a web browser's user can select or input data that is to be sent to the web server. Such user interface elements may include text entry fields, drop-down menus, checkboxes, and radio buttons, for example. The source code of the web page may express the user interface elements as tags in Hypertext Markup Language (HTML), for example.

Such a form usually also comprises a user interface element that, when activated by a user, causes the web browser to send the user-inputted form data toward the web server. Usually, this user interface element is a "submit" button control. Typically, in response to a user's activation of the "submit" button control, the web browser generates another HTTP request and sends that HTTP request toward the web server. For each user interface element in the form, the HTTP request specifies the data that the user inputted or selected via that user interface element.

For example, a form might contain separate text entry fields for a user's first name, a user's last name, a user's phone number, and a user's zip code. If the user enters data into each of these text entry fields and then clicks on the "submit" button control in the form, then the user's web browser responsively generates an HTTP request that indicates the user-entered data for each text entry field, and sends the HTTP request toward a web server—usually, the web server from which the form originated.

When the web server receives an HTTP request that contains user-entered data submitted through a form, the web server may execute a program that is designed to handle the data. For example, such a program may create a database record in a database and store the data in the database record.

In some cases, before such a program performs specified operations relative to the data, such as storing the data in a database, the program needs to validate the data. As used herein, "validating" data means determining whether the data satisfy programmer-specified criteria. If the data satisfy the specified criteria, then the data are valid. Alternatively, if the data fail to satisfy the specified criteria, then the data are invalid. Usually, if the data are invalid, then the program needs to make this fact known to the user who entered the data, and give the user another opportunity to enter valid data.

For example, if a program executing on a web server receives user-entered data that corresponds to a text entry field for a zip code, then the program may validate the data by determining whether the data comprise only digits, and whether the data comprise exactly five digits. If the data for the zip code field comprise non-digit characters or more or less than five digits, then the program needs to inform the user why the data he entered into the zip code field is invalid, and provide the user with an opportunity to enter valid data into the zip code field.

Typically, a program executing on a web server attempts to remedy the receipt of invalid user-entered data by generating a new web page and sending the new web page within an HTTP response toward the web browser. Usually, the new web page contains a form that is similar to the form that the web server previously sent to the web browser. One or more user interface elements of the form might already indicate the data that the user previously selected or entered, so that the user is not required to fill out the entire form again. Alternatively, the form might omit user interface elements through which the user previously entered or selected valid data.

Additionally, the new web page usually contains an admonition to the user. The admonition usually tells the user specifically what was wrong with the data that the user previously entered or selected. For example, if the user entered only four digits into a zip code field, then the admonition may tell the user that the contents of the zip code field must be exactly five digits.

After generating the new web page, the program executing on the web server sends the new web page toward the web browser in an HTTP response. Upon receiving the HTTP response, the web browser interprets the new web page that is contained therein and displays, to the web browser's user, the content that the web page represents, including the form and the admonition as described above. The user then has the opportunity to submit valid data to the web server through the form.

The validation process described above requires a "page refresh." That is, the validation process described above requires the web browser to send all of the user-entered form data to the web server in an HTTP request, and requires a program executing on the web server to generate and send a complete, new web page to the web browser in an HTTP response if any of the user-entered form data are invalid.

As most users of web browsers know, the time required for an HTTP request to travel from a web browser to a web server, and the time required for an HTTP response to travel from the web server to the web browser, can be agonizingly long. This is colloquially known as a "round trip." Between the time that a user submits a "submit" button control and the time that the web browser tells him that some of his data is invalid, the user often can only wait. If the web page contained in the HTTP response includes large images, then the time required to send the HTTP response from the web browser to the web server can be significant.

Some validation approaches attempt to avoid the delays that attend a page refresh by validating user-entered data at the client program (i.e., the web browser) rather than the remote web server, thereby avoiding the round trip entirely. For example, according to one approach, a web page that contains a "blank" form also comprises hidden instructions that the web browser executes in response to the occurrence of a specified event relative to a specified user interface element of the form. This practice is known as client-side validation. Such instructions are often written using JavaScript, for example.

For example, the code of the web page that the web server originally sends toward the web browser might comprise instructions that the web browser executes in response to a text field losing focus, for example (a particular user interface element "loses focus" when a user selects or activates a different user interface element after the user most recently selected or activated the particular user interface element). When executed, the instructions might cause the web browser to determine whether the data entered into the zip code field comprise exactly five digits. The instructions might cause the web browser to display a "pop-up" window, containing an admonition, if the data entered into the zip code field are invalid.

Such an approach is useful in cases where validation is simple and can be expressed through web browser-executable instructions. However, not all validation can be performed on the client side. In some cases, a determination of the validity of user-entered data can only be made by comparing the data to other data that is stored only at the web server, for example. For example, a database at the web server might contain a username and associated password that need to be retrieved before the validity of the user-entered data can be determined. It would not be practical to send the entire contents of the database to the client. For another example, considering the zip code example above, zip code validation is better performed at the server side than the client side. Using server-side validation, a server-side database could be consulted to determine whether a client-submitted zip code actually is a real zip code.

Therefore, a technique for validating user-entered data at a web server without inducing a page refresh would be both useful and desirable.

SUMMARY

In accordance with one embodiment of the present invention, there is provided a technique for validating user-entered data at a web server without inducing or requiring a page refresh.

According to one embodiment of the invention, a web server sends, toward a web browser, an initial web page that comprises a form through which the web browser's user can input data. The initial web page comprises instructions that cause the web browser to send, toward the web server, data that the user inputted into the form. This sending may be performed even before the user activates a "submit" button control in the form, and even before the form is entirely filled out, for example. The web browser may send such data asynchronously in a "validation request." The web browser's user does not even need to be aware that the web browser sent the validation request, since the web browser does not "lock up" and become unresponsive during the transmission (as the web browser would during a full page refresh).

In response to receiving the data, the web server determines whether the data satisfy specified criteria. In response to a determination that the data do not satisfy the specified criteria, the web server sends, toward the web browser, a signal that indicates invalidity. However, the signal is not a web page. Instead, the signal may take the form of a small text message, which may be significantly smaller and less complex than an entire web page.

The initial web page also comprises instructions that cause the web browser to display a message in response to receiving the signal. The message may comprise an admonition to the user as described above. Thus, in response to receiving the signal, the web browser modifies the display of the initial web page to include the message. All of the above is accomplished without the web browser requesting any other web page from the web server, and without the web server sending any other web page toward the web browser. Therefore, the validation of the user-entered data is performed at the web server without inducing a page refresh at the web browser.

DETAILED DESCRIPTION OF EMBODIMENT(S)

Overview

According to one embodiment of the invention, a method is provided for validating user-entered form data at a server without inducing or requiring a page refresh at a web browser. The page refresh is avoided by the inclusion of a special directive in the code of a web page that is compiled at a web server before being sent to the web browser. When compiled, the directive causes the web server to insert, into the compiled web page that is sent to the web browser, instructions that eventually cause the web browser to send a portion of the user-entered form data to the web server for validation—even before the entire contents of the form are submitted to the web server. The page compilation mechanism may comprise JSP technology, for example.

These instructions also cause the web browser to listen for an invalidity signal from the web server, and to perform operations in response to receiving such a signal. The signal is not a web page, however. As an example, the receipt of the signal may cause the web browser to modify the displayed contents of the currently displayed web page to include a message that tells the web browser's user that a specific portion of the user-entered form data is invalid. As a result, the web browser can display the message to a user without requesting another web page from the web server. Thus, a page refresh is avoided.

When the web server receives a portion of the user-entered data that the web browser sent as described above, the web server performs validation relative to the data by determining whether the data satisfy specified criteria. If the data satisfy the specified criteria, then the web server may notify the web browser of this fact. Alternatively, if the data do not satisfy the specified criteria, then the web server sends the invalidity signal to the web browser as described above so that the web browser can admonish a user to enter valid data via the user interface elements of the currently displayed form.

JavaServer Faces

Although alternative embodiments of the invention may use other mechanisms to implement the techniques described herein, one embodiment of the invention uses JavaServer Faces ("JSF") to implement, at least in part, the techniques described herein. JSF is a web application framework.

Generally speaking, a web application framework assists a web application developer in developing a web application. A web application is a computer program that interacts with a user across one or more networks such as the Internet. A web application typically uses standard functionality built in to a user's web browser to interface with the user—to both display information to the user and receive information from the user.

A web application framework comprises an application programming interface ("API"). An API typically comprises object-oriented classes, such as Java classes, that an application developer can incorporate into his application code; using the object-oriented property of inheritance, an application developer may derive customized classes based on the classes provided in the API. The classes provided in the API typically provide functionality that application developers would find useful in their applications. Thus, the classes provided in a web application framework typically provide functionality that web application developers would find useful in their web applications.

More specifically, JSF includes a set of APIs for (a) representing user interface elements, (b) managing the states of those user interface elements, (c) handling events that occur relative to those user interface elements, (d) validating user-entered data that are entered via those user interface elements, (e) defining web page navigation, and (f) supporting internationalization and accessibility. JSF also includes a JavaServer Pages ("JSP") custom tag library for expressing a JSF interface within a JSP page. Additional information regarding JSF is available at http://java.sun.com/j2ee/javaserverfaces/overview.html.

A web application developer can insert JSF tags into the code of a not-yet-compiled JSP page. These JSF tags are directives that, when compiled at a web server using JSP technology, cause the web server to invoke tag-associated methods of classes within the JSF API. When invoked, these methods generate tag-associated JavaScript instructions within the resulting compiled JSP page. The JavaScript instructions are customized based on the contents of the corresponding JSF tags. After compiling the JSF tags and generating the JavaScript instructions with the JSP page, the web server sends the compiled JSP page toward a requesting web browser as HTML.

When these JavaScript instructions are interpreted or executed by the web browser, the instructions cause the web browser to perform specified operations.

For example, the following JSF tags result in the eventual generation of HTML code which, when interpreted by a web browser, causes the web browser to display a text entry field of a form. The presence of the "<f:validateLength>" tag causes the JSF web framework to attach server-side instructions to the code representing the "<h:inputText>" tag to indicate that the maximum length of the text entered into the field cannot exceed 5 characters:

<h: inputText>
<f:validateLength maximum="5"/>
</h: inputText>

JSF tags that correspond to a user interface element (e.g., "<inputText>") are called "UI tags" herein, and JSF tags that indicate validation criteria (e.g., "<validateLength>") are called "validation tags" herein. The validation criteria are those criteria that data entered via the user interface element are required to satisfy in order to be considered valid. As can be seen from the above example, it is customary for the opening and closing UI tags to surround or "encapsulate" one or more validation tags.

Without more, the above JSF tags, when compiled, would cause a web server to generate server-side code which, when executed by the server in response to the web browser submitting the form, would cause the validation of the user-inputted data to be performed, and the page, including the admonition, to be sent back to the web browser using the page refresh approach described in the foregoing Background section. The web server would send a complete new page to the web browser upon determining that the user-inputted data was invalid.

The "<ajaxValidator>" JSF Tag

According to one embodiment of the invention, the JSF APIs discussed above are enhanced with the addition of a new class that the JSF APIs formerly did not contain. A method of this new class is associated with a new JSF tag, "<ajaxValidator>."

The compilation of the "<ajaxValidator>" tag causes the web server to generate JavaScript in the compiled JSP page so that server-side validation without a page refresh is enabled. When interpreted or executed by a web browser, the JavaScript instructions cause the web browser to listen for the occurrence of an event specified as an attribute within the "<ajaxValidator>" tag, and to perform specified operations when the event occurs.

According to one embodiment of the invention, a web page author inserts an opening "<ajaxValidator>" tag and a closing "</ajaxValidator>" tag into the code of a not-yet-compiled JSP page so that the opening and closing tags surround, "encapsulate," or "wrap" an existing UI tag. When the opening and closing tags are inserted in this manner, the enclosed UI tag (e.g., "<h:inputText>" below) is said to be "nested within" the enclosing tags (e.g., "<d:ajaxValidator>" below). For example, following the insertion of "<ajaxValidator>" tags into the code of a not-yet-compiled JSP page as described above, a portion of the not-yet-compiled JSP page code might look like this:

<d:ajaxValidator messageId="input1" eventhook="onkeypress">
  <h:inputText>
    <f:validateLength maximum="5"/>
  </h: inputText>
</d:ajaxValidator>

When the above tags are compiled at a web server, the web server generates a compiled JSP page that comprises JavaScript instructions which, when executed or interpreted at a web browser, cause the web browser to initiate a kind of server-side validation that does not require a page refresh.

Essentially, the presence of the "<ajaxValidator>" tags in the not-yet-compiled JSP page causes the web server to compile the "encapsulated" UI and validation tags in a different manner. The resulting JavaScript indicates the event type that is specified as an attribute of the opening "<ajaxValidator>" tag, as well as the validation criteria that were specified as attributes of the encapsulated validation tags. The presence of the "<ajaxValidator>" tag causes JavaScript code to be generated and inserted into whatever component is nested within the "<ajaxValidator>" tags, without the user taking any specific action relative to the nested tag to support this behavior. Thus, various embodiments of the invention may be used in conjunction with any JSF component.

According to one embodiment of the invention, when a web browser interprets or executes the JavaScript instructions that were customized due to the compilation of the "<ajaxValidator>" tag, the web browser initiates an event listener that determines when the JavaScript-specified event type ("onkeypress" in the example above) occurs relative to the user interface element corresponding to the encapsulated UI tag. When the event listener determines that the specified event type has occurred relative to the user interface element, the web browser sends the JavaScript-specified validation criteria toward a validation process executing on a web server. The web browser also sends, toward the validation process, data entered or selected by a user via the user interface element that corresponds to the encapsulated UI tag ("<inputText>" in the example above). The web browser does not need to send the contents of the entire form, however.

In one embodiment of the invention, the web browser sends the data and the criteria over the Internet to the remote web server by invoking methods of the "XMLHttpRequest" object, which is already provided and supported by most web browsers.

The validation process, executing on the web server, receives the data and the criteria. The process determines whether the data satisfy the criteria. If the data satisfy the criteria, then the process may send, to the web browser, a signal that indicates that the data are valid. Alternatively, if the data do not satisfy the criteria, then the process sends an invalidity signal to the web browser.

In one embodiment of the invention, the web browser receives the invalidity signal via the "XMLHttpRequest" object discussed above.

According to one embodiment of the invention, in response to receiving an invalidity signal from the process, the web browser displays a message to the web browser's user. In one embodiment of the invention, the invalidity signal contains the actual content of the message to be displayed. The message may tell the user what was wrong with the data that he entered, for example. After displaying the message, the web browser may clear the user-inputted data from the appropriate user interface element and give the user another opportunity to supply valid data.

In one embodiment of the invention, the message is displayed in a "pop-up" box or window that the user may remove from view by activating a button control in the box or window. In another embodiment of the invention, the code of the original JSP page comprises a tag that serves as a placeholder for the message. In such an embodiment of the invention, in response to receiving the invalidity signal, the web browser modifies the display of the currently displayed web page so that the display includes the message at the point in the page at which the placeholder tag occurs, without reloading or refreshing the web page.

According to one embodiment of the invention, between (a) the time that the web server determines whether the user-entered data satisfy the validation criteria and (b) the time that the web browser displays the message to the user, the web browser does not receive any web page from the web server, and the web server does not send any web page toward the web browser. The signal that the web server sends toward the web browser in response to an invalidity determination can be much smaller than the web page that contains the form. The data entered through each user interface element of the form can be validated separately and rapidly. A user can be instructed to fix erroneously entered data even before the user has finished filling out the entire form.

Thus, using the techniques described above, user-entered data can be validated at a web server without requiring the web browser through which the data was entered to perform a page refresh.

Example Server-Side Data Validation Technique

Figure 1:
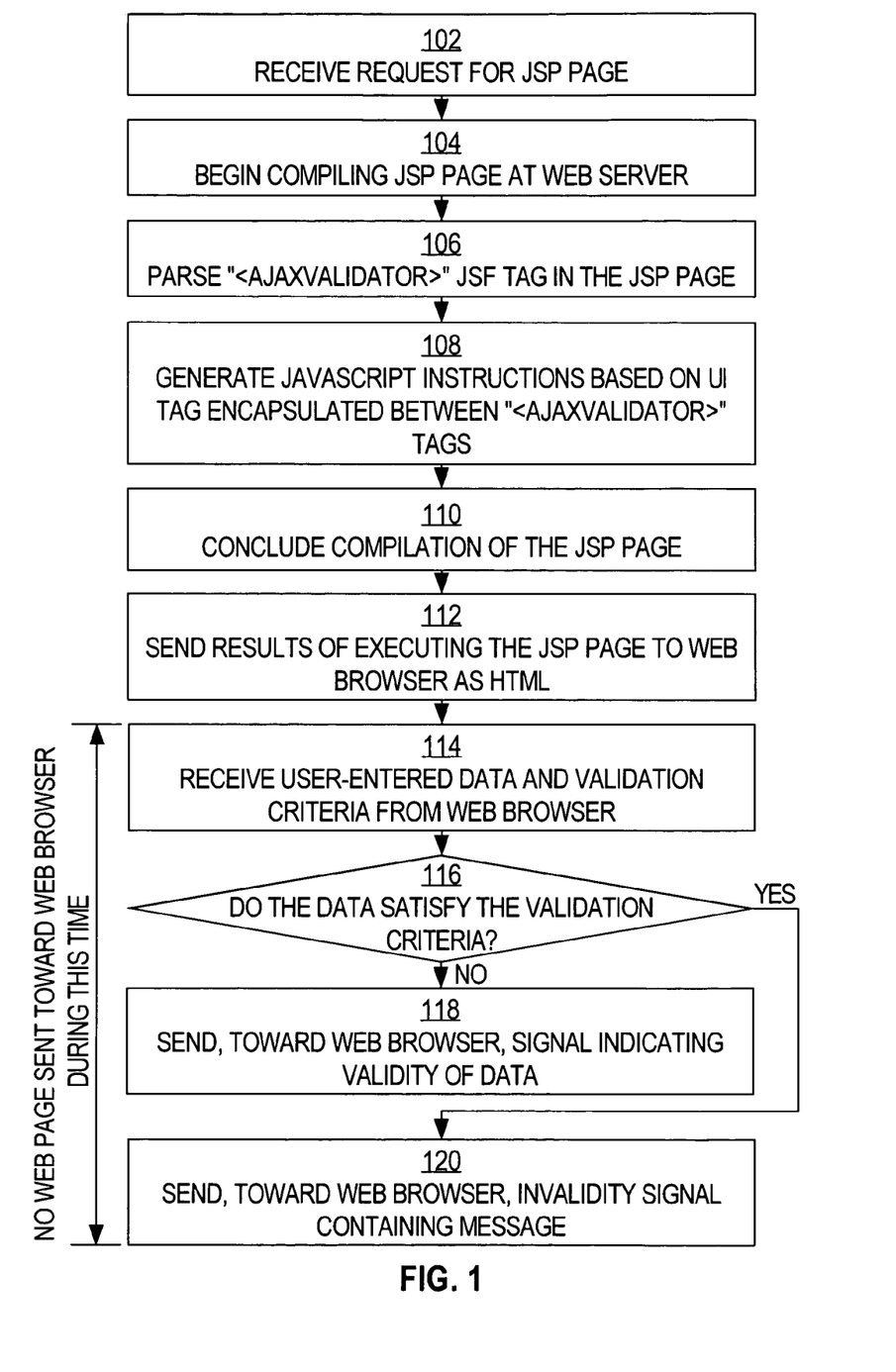
FIG. 1 is a flow diagram that illustrates an example of a technique for performing server-side validation of user-entered form data, according to an embodiment of the present invention.

FIG. 1 is a flow diagram that illustrates an example of a technique for performing server-side validation of user-entered form data, according to an embodiment of the present invention. The technique may be performed by a web server, for example. Such a web server may be implemented on a computer such as is described with reference to FIG. 2 below, for example.

In block 102, a request for a JSP page stored on a web server is received from a web browser. In block 104, compilation of the JSP page begins at the web server. In one embodiment, if the requested JSP page already has been compiled, then a cached version of the compiled JSP page may be used to respond to the web browser's request, and blocks 106-110 below can be skipped.

In block 106, an opening "<ajaxValidator>" JSF tag is parsed in the JSP page. In block 108, in response to the parsing of the opening "<ajaxValidator>" JSF tag, JavaScript instructions that correspond to a UI tag encapsulated between the opening "<ajaxValidator>" JSF tag and a closing "</ajaxValidator>" JSF tag are generated and inserted into the JSP page. In one embodiment, these JavaScript instructions comprise instructions that cause a web browser to display the user interface element that corresponds to the encapsulated UI tag.

The JavaScript instructions specify (a) an event type and (b) validation criteria. When interpreted or executed by a web browser, the JavaScript instructions cause the web browser to initiate an event listener that determines when an event of the event type occurs relative to a user interface element corresponding to the UI tag. When the event listener determines that an event of the event type has occurred relative to a user interface element, the JavaScript instructions cause the web browser to send, to the web server, (a) data that a user inputted through the user interface element, and (b) the validation criteria.

In block 110, compilation of the JSP page concludes. In block 112, the compiled JSP page is executed and the output resulting from the execution of the JSP page is sent toward the web browser as HTML.

In block 114, the data and the validation criteria, sent from the web browser, are received at the web server. In block 116, it is determined, at the web server, whether the data satisfy the validation criteria. If the data satisfy the validation criteria, then control passes to block 118. Otherwise, control passes to block 120.

In block 118, a signal indicating that the data are valid is sent toward the web browser. The signal may be empty or NULL, for example. The web browser does not need to take any action in response to receiving such a signal.

Alternatively, in block 120, an invalidity signal that contains a message is sent toward the web browser. The message may inform a user that the data he entered via the user interface element are invalid for a specific reason (e.g., for exceeding the maximum acceptable length for a text entry field). When the web browser receives the message, the web browser displays the message to the user without performing a page refresh.

No modification needs to be made to the web browser in order to implement the techniques described above. Essentially, the web browser receives the compiled JSP page from the web server, with the JavaScript instructions. The web browser's execution of the JavaScript instructions resulting from the web server's compilation of the "<ajaxValidator>" tag automatically causes the web browser to send user-inputted data and validation criteria to the web server in response to the occurrence of an event of the event type specified in the tag.

Onload Event Handling

Among the events that the JavaScript specification provides for is the "onload" event. The "onload" event occurs relative to a web page when the web page is first loaded by the web browser, but before the web browser displays the contents of the web page to the web browser's user. Thus, when web page authors want some operations to occur at the time that a web page is loaded, they code the web page in a way such that the operations are included among those that are performed when the "onload" event occurs.

When JavaScript is placed in the "HEAD" element of a web page (i.e., between the "<HEAD>" and "</HEAD>" tags), that JavaScript gets executed after the entire page has been loaded by a web browser. Any JavaScript that is present in the value of the "onload" attribute of the HTML "<BODY>" tag also is executed at this time.

As is discussed above, a not-yet-compiled JSP page may be coded to contain JSF tags that, when compiled by a web server, are automatically translated into JavaScript instructions that a web browser subsequently may execute. Previously, in order to get the JavaScript instructions automatically generated from the compilation of a JSF tag to be executed in response to the "onload" event, it was necessary for a JSP page's author to edit the JSP page to add additional "onload enabling" JavaScript instructions to the page's "HEAD" element. Usually, these "onload enabling" JavaScript instructions would refer to other JavaScript instructions that would automatically be generated in the body of the JSP page upon compilation. Adding such "onload enabling" JavaScript instructions was troublesome to JSP page authors.

Described herein are techniques for avoiding the requirement of manually adding such "onload enabling" JavaScript instructions. As a result of the techniques described herein, a JSP page author needs only to place a JSF tag anywhere in a JSP page; the "onload enabling" JavaScript instructions are automatically generated when the web server compiles the JSP page.

According to one embodiment of the invention, when a JSF tag in a JSP page is parsed at compile-time, the compiler generates new JavaScript file that is external to the JSP page. The compiler also generates a "script tag" that refers to the new JavaScript file, and stores this "script tag" in the "HEAD" element of the JSP page.

The JSP page may already contain some existing JavaScript instructions that are supposed to be executed in response to the occurrence of the "onload" event. If the JSP page contains such existing JavaScript instructions, then the compiler stores those existing JavaScript instructions in memory for later execution at the appropriate time.

For example, the JSP page may already contain an existing "window.onload" function whose body contains JavaScript instructions. These JavaScript instructions should continue to be executed in response to the occurrence of the "onload" event. Therefore, in one embodiment of the invention, the JSF component generates new JavaScript instructions to save the existing user-specified JavaScript instructions, which are intended to execute at the appropriate time, into memory. For example, the user-specified JavaScript instructions may be saved in a global variable called "g_onload." The new JSF component-generated JavaScript instructions then overwrite the existing user-specified JavaScript instructions (but not the copy saved in the "g_onload" global variable) with special JavaScript code. This special JavaScript code is called the "custom onload handler." The custom onload handler performs JSF component-specific initialization actions and then calls the existing user-specified JavaScript instructions, which were saved in the "g_onload" global variable. The custom onload handler is described below.

The responsibility of the custom onload handler is to enable JSF components to be notified of the "onload" event while preserving the user-specified onload JavaScript code.

In one embodiment of the invention, the JSF component generates globally scoped JavaScript that includes a globally scoped JavaScript array called "g_onloadCallbacks." Also, each JSF component in the page generates component-scoped JavaScript that adds an entry to the "g_onloadCallbacks" array. Each such entry is a pointer to a JavaScript function that is assumed to be executed in response to the "onload" event.

For example, if there are three JSF components in the page, then according to one embodiment of the invention, there will be one globally scoped JavaScript file that is referenced in the "<HEAD>" HTML element. This JavaScript file will contain the "g_onload" and "g_onloadCallbacks" global variables and the globally scoped custom onload handler function. In addition to the globally scoped JavaScript file, each of the three JSF components will generate JavaScript into the main HTML code of the page. The JavaScript generated by each JSF component adds a JavaScript function pointer entry to the "g_onloadCallbacks" array.

When called by the web browser in response to the one and only "onload" event, the custom onload handler will iterate over the callbacks in the "g_onloadCallbacks" array, invoking each pointed-to function in turn, and then invoking any user-specified onload JavaScript instructions, if present.

As a result of the techniques described above, a web page author is spared from the burden of manually adding custom "onload enabling" JavaScript code to his web page.

Hardware Overview

Figure 2:
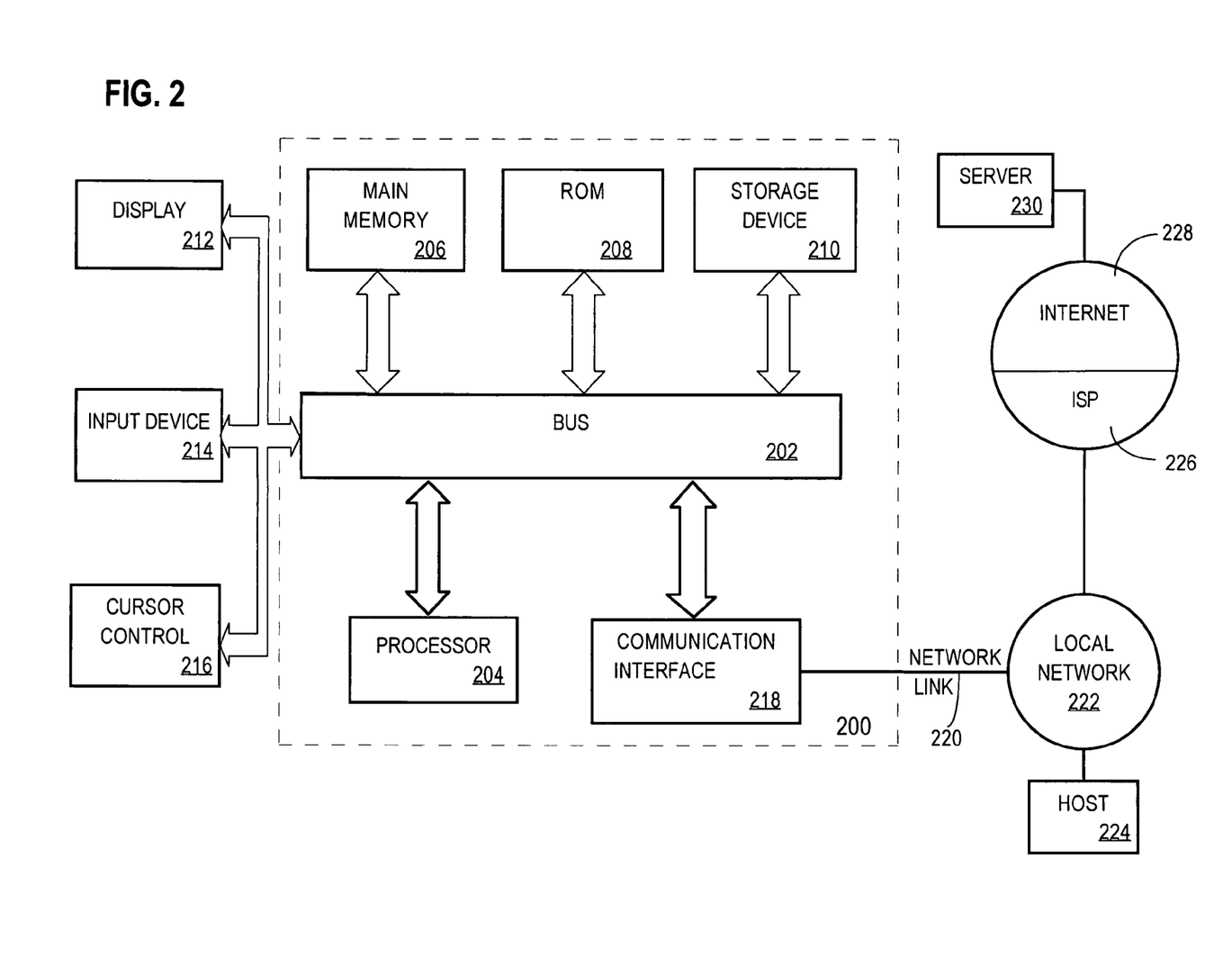
FIG. 2 is a hardware block diagram of an example computer entity, upon which certain embodiments of the invention may be implemented.

FIG. 2 is a block diagram that illustrates a computer system 200 upon which an embodiment of the invention may be implemented. Computer system 200 includes a bus 202 for facilitating information exchange, and one or more processors 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions by processor 204. Computer system 200 may further include a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

In computer system 200, bus 202 may be any mechanism and/or medium that enables information, signals, data, etc., to be exchanged between the various components. For example, bus 202 may be a set of conductors that carries electrical signals. Bus 202 may also be a wireless medium (e.g. air) that carries wireless signals between one or more of the components. Bus 202 may also be a medium (e.g. air) that enables signals to be capacitively exchanged between one or more of the components. Bus 202 may further be a network connection that connects one or more of the components. Overall, any mechanism and/or medium that enables information, signals, data, etc., to be exchanged between the various components may be used as bus 202.

Bus 202 may also be a combination of these mechanisms/media. For example, processor 204 may communicate with storage device 210 wirelessly. In such a case, the bus 202, from the standpoint of processor 204 and storage device 210, would be a wireless medium, such as air. Further, processor 204 may communicate with ROM 208 capacitively. In this instance, the bus 202 would be the medium (such as air) that enables this capacitive communication to take place. Further, processor 204 may communicate with main memory 206 via a network connection. In this case, the bus 202 would be the network connection. Further, processor 204 may communicate with display 212 via a set of conductors. In this instance, the bus 202 would be the set of conductors. Thus, depending upon how the various components communicate with each other, bus 202 may take on different forms. Bus 202, as shown in FIG. 2, functionally represents all of the mechanisms and/or media that enable information, signals, data, etc., to be exchanged between the various components.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. According to one embodiment of the invention, the transmission media referred to above are tangible (i.e., "substantially real") media.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 220 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for validating user-entered data, the method comprising:
   receiving, at a server, from a client program, a request for a first web page that comprises a form through which a user of the client program can input data;
   in response to receiving the request at the server, compiling code for the first web page at the server,
   wherein compiling code for the first web page at the server comprises (a) parsing one or more Java Server Faces (JSF) tag components of a document to retrieve tag information, (b) generating, based on said tag information, one or more particular instructions that will cause the client program to send, toward the server, first data that the user inputs into the form, and (c) inserting the one or more particular instructions into the first web page prior to sending the first web page from the server toward the client program, wherein the one or more JSF tag components is an AJAX validation tag that encapsulates a UI tag, and wherein the one or more particular instructions are configured to cause a web browser interpreting the first web page to initiate a server-side validation that does not require a page refresh;
   sending the first web page toward the client program;
   determining, at the server, at a first time, whether the first data satisfies specified criteria; and
   in response to a determination that the first data does not satisfy the specified criteria, sending, toward the client program, a signal that indicates invalidity, wherein the signal is not a web page.

2. The method of claim 1, wherein generating the one or more particular instructions comprises generating script instructions that cause the client program to display a user interface element of the form.

3. The method of claim 1, wherein the one or more particular instructions cause the client program to send the first data toward the server in response to determining that an event of a specified event type has occurred relative to a user interface element with which the specified criteria are associated.

4. The method of claim 1, wherein the one or more particular instructions cause the client program to send the specified criteria toward the server in response to determining that an event of a specified event type has occurred relative to a user interface element with which the specified criteria are associated.

5. The method of claim 1, wherein the invalidity signal comprises a message.

6. A machine-readable volatile or non-volatile medium storing one or more sequences of instructions, which instructions, when executed by one or more processors, cause the one or more processors to carry out the steps of:
   receiving, at the server, from a client program, a request for the first web page that comprises a form through which a user of the client program can input data;
   in response to receiving the request at the server, compiling code for the first web page at the server;
   wherein compiling code for the first web page at the server comprises (a) parsing one or more Java Server Faces (JSF) tag components of a document to retrieve tag information, (b) generating, based on said tag information, one or more particular instructions that will cause the client program to send, toward the server, first data that the user inputs into the form, and (c) inserting the one or more particular instructions into the first web page prior to sending the first web page from the server toward the client program, wherein the one or more JSF tag components is an AJAX validation tag that encapsulates a UI tag, and wherein the one or more particular instructions are configured to cause a web browser interpreting the first web page to initiate a server-side validation that does not require a page refresh;
   sending the first web page toward the client program
   determining, at the server, at a first time, whether the first data satisfies specified criteria; and
   in response to a determination that the first data does not satisfy the specified criteria, sending, toward the client program, a signal that indicates invalidity, wherein the signal is not a web page.

7. The machine-readable volatile or non-volatile medium of claim 6, wherein generating the one or more particular instructions comprises generating script instructions that cause the client program to display a user interface element of the form.

8. The machine-readable volatile or non-volatile medium of claim 6, wherein the one or more particular instructions cause the client program to send the first data toward the server in response to determining that an event of a specified event type has occurred relative to a user interface element with which the specified criteria are associated.

9. The machine-readable volatile or non-volatile medium of claim 6, wherein the one or more particular instructions cause the client program to send the specified criteria toward the server in response to determining that an event of a specified event type has occurred relative to a user interface element with which the specified criteria are associated.

10. The machine-readable volatile or non-volatile medium of claim 6, wherein the invalidity signal comprises a message.

* * * * *